United States Patent [19]

Masuda

[11] 4,358,329

[45] Nov. 9, 1982

[54] SAFETY LAMINATE AND PROCESS FOR PRODUCTION THEREOF

[75] Inventor: Eisuke Masuda, Jyoyo, Japan

[73] Assignee: Sekisui Kagaku Kogyo Kabushiki Kaisha, Osaka, Japan

[21] Appl. No.: 181,224

[22] Filed: Aug. 25, 1980

[51] Int. Cl.³ .................... B32B 31/00; B32B 17/06
[52] U.S. Cl. .................... 156/106; 156/99; 156/306.6; 156/308.6; 156/309.3; 156/324.4; 428/430; 428/435; 428/437
[58] Field of Search .................... 156/99–100, 156/106, 306.6, 308.2, 308.6, 309.3, 313, 324.4; 428/430–431, 435, 436–437, 440–442

[56] References Cited

U.S. PATENT DOCUMENTS

| | | | |
|---|---|---|---|
| 3,388,032 | 6/1968 | Saunders | 428/215 |
| 3,388,034 | 6/1968 | McCombie | 428/215 |
| 3,458,388 | 7/1969 | Moynihan | 428/215 |
| 3,539,412 | 11/1970 | Miller | 156/106 |
| 4,020,217 | 4/1977 | Karasudani et al. | 428/429 |
| 4,277,538 | 7/1981 | Beckmann et al. | 156/106 |

FOREIGN PATENT DOCUMENTS 39-20177  9/1964  Japan.
1219630  1/1971  United Kingdom.

*Primary Examiner*—Edward C. Kimlin
*Assistant Examiner*—Lois E. Boland
*Attorney, Agent, or Firm*—Wenderoth, Lind & Ponack

[57] ABSTRACT

A process for producing a safety laminate comprising at least two plates bonded to each other through an adhesive interlayer, which comprises (1) applying an adhesiveness-imparting agent being liquid at ambient temperature and substantially non-adhesive to said plates to at least one of (a) the surface of each of said plates and (b) each surface to be bonded to said surface (a) of a sheet-like adhesive material which is substantially non-adhesive, and only latently adhesive, to said plates, said adhesiveness-imparting agent being capable of developing the latent adhesiveness of said sheet-like adhesive material; and (2) sandwiching said sheet-like adhesive material as an interlayer between two of said plates to bond said plates through the interlayer of said sheet-like adhesive material having its adhesiveness developed; and a safety laminate produced by aforesaid process.

10 Claims, No Drawings

SAFETY LAMINATE AND PROCESS FOR PRODUCTION THEREOF

This invention relates to a safety laminate such as a laminated safety glass, and more specifically, to a safety laminate consisting of at least two firmly bonded plates through adhesive interlayers, and to a commercially advantageous process for its production.

For example, laminated safety glasses composed of two glass sheets bonded to each other through an interlayer of a synthetic resin have been marketed heretofore. Because of their high price, however, they have not gained acceptance in all of the applications which require safety. The high cost of production is due to the fact that production of such a laminated safety glass must go through a time-consuming and complex process involving inserting an interlayer between two glass sheets, preliminarily bonding them, and heating the assembly under pressure in an autoclave to complete bonding (see U.S. Pat. Nos. 3,388,032, 3,388,034, 3,458,388 and 4,020,217).

It was proposed to omit such a complex heat-bonding step in an autoclave employing a method comprising pouring an unpolymerized or partially polymerized liquid adhesive composition between two glass sheets, and polymerizing and solidifying the composition therein (see Japanese Patent Publication No. 20177/64 and British Pat. No. 1219630). This method, however, has the defect that bubbles are liable to come into the liquid adhesive, the two glass sheets are difficult to maintain parallel to each other in producing a laminate glass of a broad area, and a uniform polymer is difficult to produce because of different reactivity ratios between monomers, and consequently the glass becomes opalescent or partially shrinks to give a laminate having optical non-uniformity and non-uniform strength.

It is an object of this invention to provide a process for producing a safety laminate easily at a low cost of production without requiring a step of heat-bonding.

It is another object of this invention to provide a safety laminate having stable quality and good bond strength.

Other objects and advantages of this invention will become apparent from the following description.

In accordance with this invention, these objects and advantages are achieved by a process for producing a safety laminate comprising at least two plates bonded to each other through an adhesive interlayer, which comprises (1) applying an adhesiveness-imparting agent being liquid at ambient temperature and substantially non-adhesive to said plates to at least one of (a) the surface of each of said plates and (b) each surface to be bonded to said surface (a) of a sheet-like adhesive material which is substantially non-adhesive, and only latently adhesive, to said plates, said adhesiveness-imparting agent being capable of developing the latent adhesiveness of said sheet-like adhesive material; and (2) sandwiching said sheet-like adhesive material as an interlayer between two of said plates to bond said plates through the interlayer of said sheet-like adhesive material having its adhesiveness developed.

According to another aspect of this invention, these objects and advantages are achieved by a safety laminate comprising at least two plates bonded to each other through an adhesive interlayer composed of a sheet-like adhesive material which is substantially non-adhesive, and only latently adhesive, to said plates and an adhesiveness-imparting agent which is liquid at ambient temperature and substantially non-adhesive to said plates and has the property of developing the latent adhesiveness of said sheet-like adhesive material.

The plates used in this invention may be glass sheets or organic synthetic resin plates. Accordingly, at least two plates constituting the safety laminate in accordance with this invention may be glass sheets, a combination of a glass sheet and an organic synthetic resin plate, or organic synthetic resin plates. Suitable organic synthetic resin plates are plates of resins having good transparency such as polyvinyl chloride, polymethacrylate, polycarbonate and unsaturated polyester resins.

The essence of the process of this invention is that at least two plates of the above-exemplified types are bonded to each other, without positive heating and pressing, by a sheet-like adhesive material which is substantially non-adhesive, and only latently adhesive, to the plates and an adhesiveness-imparting agent which is liquid at ambient temperature and substantially non-adhesive to the plates and has the property of developing the latent adhesiveness of the sheet-like adhesive material.

The expression "being substantially non-adhesive to the plates" means that when a laminated article composed of two plates and an interlayer, the bond strength between the adjacent layers is insufficient for the laminated article to be used as a safety laminate in practical applications.

The expression "latent adhesiveness", as used herein, means the property of a material to have substantial non-adhesiveness in the untreated state, but to develop adhesiveness when it is treated with an adhesiveness-imparting agent. Accordingly, the "latent adhesiveness" differs from adhesiveness which is to be developed by heating and pressing.

The sheet-like adhesive material used in this invention which is substantially non-adhesive to the plates and only latently adhesive thereto has an adhesiveness, determined by a tack test method, of No. 3 or below.

The sheet-like adhesive material may be made of various materials such as acrylic resins, polyvinylbutyral resins, maleic anhydride resins, polyester resins, polyvinyl alcohol resins, vinyl chloride resins, polyamide resins, ethylene copolymer resins and rubbers. These materials should be substantially non-adhesive, and only latently adhesive, to the plates to be bonded. The aforesaid resins and rubbers may be homopolymers or copolymers, and the types of monomers and comonomers of these resins, the ratio of comonomers, etc. are selected such that the resulting polymers are substantially non-adhesive, and latently adhesive, to these plates. These polymers are generally non-tacky.

Examples of such acrylic resins are homopolymers or copolymers having as recurring units at least one acrylic monomer such as methyl methacrylate, ethyl methacrylate, butyl methacrylate, methacrylic acid, methyl acrylate, ethyl acrylate, butyl acrylate, 2-ethylhexyl acrylate, acrylic acid, and other acrylates or methacrylates. These copolymers may contain at least 50 mole%, preferably at least 80 mol%, based on the entire recurring units, of at least one acrylic monomer, and therefore may contain less than 50 moles%, preferably less than 20 mole%, based on the entire recurring units, of another monomer such as vinyl acetate, acrylonitrile, methacrylonitrile, styrene, vinyl pyrrolidone, vinylpyridine, itaconic acid or crotonic acid.

Preferred polyvinyl butyral resins are, for example, those having a degree of acetalization of 55 to 80 mole%.

The term "degree of acetalization", as used herein, denotes the proportion in mole% of acetalized recurring units of the polyvinylbutyral resin based on the entire recurring units in the polyvinyl alcohol molecule before acetalization.

Suitable polyester resins include copolyesters derived from an acid component composed of at least 40 mole% of terephthalic acid and not more than 60 mole% of another aromatic dibasic acid such as diphenyldicarboxylic acid, isophthalic acid or orthophthalic acid or an aliphatic dibasic acid such as adipic acid or sebacic acid and a glycol component which is at least one of $C_2$–$C_{10}$ alkylene glycols and dialkylene glycols. These copolyesters are disclosed, for example, in Japanese Patent Publication No. 33253/79 which is cited herein as reference.

In order to prevent blocking or control bond strength, these copolyesters may be used in combination with styrenemaleic anhydride resins, nitrocellulose, soluble vinyl chloride resins, phenolic resins, isocyanate resins, xylene resins, chlorinated rubbers, vinylidene chloride resins, chlorinated polypropylene resins, coumarone resins, triazine-formaldehyde resins, rosin ester resins, arylsulfonamide resins, etc.

Examples of the maleic anhydride resins are copolymers of maleic anhydride with methylvinyl ether, ethylvinyl ether, vinyl acetate or styrene. Examples of the polyvinyl alcohol resins are preferably those having a degree of saponification of about 88 mole% and a degree of polymerization of 1400 to 1800. The polyvinyl alcohol resins develop especially good adhesiveness when used in combination with the maleic anhydride resins.

The vinyl chloride resins preferably include vinyl chloride-vinyl acetate copolymer, vinyl chloride-vinyl acetate-maleic anhydride copolymer and vinyl chloride-vinyl acetate-polyvinyl alcohol copolymer. The vinyl chloride resins develop especially good adhesiveness when used in combination with acrylic resins, alkylphenol resins, ester gum, etc.

Examples of the polyamide resins are polycondensates between dimers of fatty acids such as soybean oil, tung oil or tall oil and alkylene diamines such as ethylenediamine or diethylene triamine. These polyamide resins are used favorably with other resins to control bond strength.

A copolymer of ethylene and vinyl acetate in which at least 40 mole% of the entire recurring units consists of ethylene units is a preferred examples of the ethylene copolymer resins. To control bond strength, the ethylene copolymer resins may be used in combination with a tackifier such as polyisobutylene, butyral resins, petroleum resins or rosin.

Examples of the rubbers are polychloroprene, styrene-butadiene rubber (SBR), polybutadiene and polyisobutylene. Desirably, the rubbers are used in combination with adhesiveness-imparting resins such as butyral resins, petroleum resins or rosin.

Among the above-exemplified materials, acrylic resins, polyvinyl butyral resins and polyester resins are preferred because of their adhesiveness, transparency and compatibility with adhesiveness-imparting agents.

The sheet-like adhesive material used in this invention may be a sheet formed only of such a material as exemplified hereinabove, or it may be a sheet-like material comprising a film substrate and thin layers of such a material on opposite surfaces of the substrate. The sheet-like adhesive material including such a film substrate is preferred because in the event of breakage of safety glass, it can effectively prevent scattering of glass fragments and maintain high resistance to penetration. Preferably, the film substrate is a film of a polyester, polyvinyl chloride, polyamide, polycarbonate, ethylene/acrylic acid copolymer, ethylene/vinyl acetate copolymer, etc. Preferably such a film substrate is transparent and has a tensile strength of at least 100 kg/cm$^2$ and an elongation of at least 100%. Films of polyesters, such as polyethylene terephthalate, are especially preferred because of their superior transparency, tensile strength and elongation. Depending upon the purpose of use, these film substrates may be colored, printed, coated by vacuum evaporation, or incorporated with an ultraviolet absorber.

The adhesiveness-imparting agent used in the process of this invention develops the latent adhesiveness of the aforesaid sheet-like adhesive material by contact therewith. The adhesiveness-imparting agent is liquid at ambient temperature and is substantially non-adhesive to the plates used in this invention, such as glass sheets. A suitable adhesiveness-imparting agent is selected depending upon the type of the sheet-like adhesive material used. The adhesiveness-imparting agent has a viscosity of generally not more than 5000 centipoises, preferably 1 to 500 centipoises. Examples of the adhesiveness-imparting agent are water, oils, high-boiling solvents, plasticizers, and low-molecular-weight liquid resinous materials. As mentioned above, these agents are preferably selected depending upon the type of the sheet-like adhesive material used, but the plasticizers can be used together with various materials and are especially preferred in this invention.

Especially suitable adhesiveness-imparting agents are exemplified below.

For use with acrylic resins

Phthalic esters such as dimethyl phthalate (DMP), diethyl phthalate (DEP), dibutyl phthalate (DBP), diheptyl phthalate (DHP), dioctyl phthalate (DOP), ethylphthallylethyl glycolate (EPEG), methylphthallylethyl glycolate (MPEG) and butylphthallylbutyl glycolate; trimellitic esters such as trioctyl trimellitate (TOTM); fatty acid esters such as dibutyl sebacate (DBS) and dioctyl sebacate (DOS); glycerin esters such as glycerol triacetate; orthophosphoric esters such as triethyl phosphate (TEP), tributyl phosphate (TBP), tributoxyethyl phosphate (TBXP), and triphenyl phosphate (TPP); and dibutyl maleate (DBM) and dibutyl fumarate (DBF).

For use with polyvinylbutyral resins

Phthalic esters such as DMP, DEP, DBP, butylbenzyl phthalate (BBP), ethylphthallylethyl glycolate (#10), methylphthallylethyl glycolate (#20) and butylphthallylbutyl glycolate (#30); fatty acid esters such as methylacetyl ricinolate (MAR); orthophosphoric esters such as TEP, TBP, trioctyl phosphate (TOP), TBXP, trischloroethyl phosphate (CLP), tricresyl phosphate (TCP), trixylenyl phosphate (TXP), octyldiphenyl phosphate (TCP) and cresyl diphenyl phosphate; and glycol esters such as triethylene glycol dibutyrate, triethylene glycol diglycol butyrate and triethylene glycol diethyl hexoate.

For use with polyester resins

Phthalic esters such as DMP, DBP, diisodecyl phthalate (DIDP), DHP and BBP; orthophosphoric esters such as trimethyl phosphate (TMP), TEP, TBP, TBXP, CLP, TCP and diphenyl mono-o-xoxenyl phosphate; glycol esters such as EPEG, MPEG and BPBG; and maleic or fumaric esters such as diethyl maleate (DEM), DBM, and DBF.

For use with polyvinyl alcohol resins and maleic anhydride resins

Water, polyhydric alcohols such as glycol, polyethylene glycol, polyoxyethylene alkylphenol ether and polyoxyethylene aryl ether and derivatives thereof.

For use with polyamide resins

Hydroxybenzoic acid, and sulfonamides such as toluene-ethylsulfonamide.

For use with vinyl chloride resins

High-boiling solvents such as octyl acetate, cyclohexanone, Cellosolve acetate, butyl Cellosolve, glycerol and octanol; and plasticizers such as phthalic esters, fatty acid esters, polyesters or epoxidized esters.

For use with rubbers

Animal and vegetable oils such as fatty oils or tall oil, mineral oils such as process oils and paraffins, and liquid resinous materials such as diene-type oligomers.

For use with ethylene copolymer resins

Liquid resinous materials such as low-molecular-weight polyethylene, liquid polypropylene and liquid polybutene, phthalate plasticizers such as dibutyl phthalate and dioctyl phthalate, phosphate plasticizers such as trichlorophosphate, and glycol plasticizers.

The process of this invention is performed by applying the adhesiveness-imparting agent to at least one of opposite surfaces to be bonded of at least two plates and the sheet-like adhesive material by coating or spraying, and then sandwiching the sheet-like adhesive material as an interlayer between the plates. The adhesiveness-imparting agent is supplied to at least one of (a) the surface of each plate and (b) each surface to be bonded to said surface (a) of the sheet-like adhesive material. If the viscosity of the adhesiveness-imparting agent is too low, it is liable to leak out from the edge portions of two laminated plates. If its viscosity is too high, air bubbles included at the time of laminating the two plates do not easily escape. Hence, the adhesiveness-imparting agent should desirably have a viscosity of not more than 5000 centipoises, preferably 1 to 500 centipoises.

The amount of the adhesiveness-imparting agent differs depending upon the thickness of the sheet-like adhesive material, but is usually about 2 g to about 20 g per $m^2$ of bonded surface (i.e., about 7 to about 67% by weight based on the sheet-like adhesive material) when the sheet-like material has a thickness of, for example, 30 microns.

The greatest characteristic of the process of this invention is that since the sheet-like adhesive material and the adhesiveness-imparting agent are substantially non-adhesive by themselves, they are easy to handle, and for example, no release paper is required for the sheet-like adhesive material. The sheet-like adhesive does not always develop sufficient adhesiveness immediately upon the application of the adhesiveness-imparting agent thereto. Rather, a certain period of time is generally required for the sheet-like adhesive material to attain sufficient adhesiveness. In the practice of the process of this invention, therefore, the sheet-like adhesive material having the adhesiveness-imparting agent applied thereto can be easily handled.

Accordingly, in the process of this invention, the sheet-like adhesive material can be laminated to a plate after it has been let stand for a sufficient period of time after application of the adhesiveness-imparting agent to develop sufficient adhesiveness. In view of the ease of handling mentioned above, however, it is operationally desirable to laminate the sheet-like adhesive material to a plate before the sheet-like adhesive material develops sufficient adhesiveness, and to let it develop sufficient adhesiveness gradually.

As a result of lamination to the plates, the sheet-like adhesive material undergoes pressure, and this facilitates the development of adhesiveness (activation) by the adhesiveness-imparting agent. Pressing after lamination and spreading of the adhesiveness-imparting agent on the bonding surfaces are preferred, but pressing after application of pressure following the lamination is not particularly required. The process of this invention can be fully practiced under a pressure which corresponds to the own weight of the plate itself.

Generally, the sheet-like adhesive material activated by the adhesiveness-imparting agent tends to have its cohesive force reduced by the effect of the adhesiveness-imparting agent. To avoid this tendency, it is possible to incorporate a crosslinking agent in the sheet-like adhesive material or the adhesiveness-imparting resin or both. If desired, known additives such as coloring agents, fillers, antioxidants and tackifying resins may be incorporated into the sheet-like adhesive material, or the adhesiveness-imparting agent or both.

According to the process of this invention, a safety laminated article composed of at least two plates bonded to each other through an adhesive interlayer composed of the sheet-like adhesive material and the adhesiveness-imparting agent can be produced without the need for heating and pressing after lamination as in conventional methods. Hence, the laminated article can be produced easily, and since no positive means of heating and pressing are required, the process steps and manufacturing facilities can be simplified and the cost of productin can be reduced.

Moreover, since the adhesiveness-imparting agent and the sheet-like adhesive material activated by the adhesiveness-imparting agent have flowability, they fill the depressed portions of the surfaces of the plates or the surfaces of the sheet-like adhesive material after lamination. Also, they do not generate foams. All this leads to the advantage of providing a safety laminate having uniform bond strength and superior quality.

According to this invention, there is provided a laminated safety glass containing an adhesive interlayer which has a bond strength and a holding power, with respect to a glass sheet measured by the methods stipulated in JIS Z1524, of at least 600 g /25, mm, and 0.3 mm to 25 mm, respectively.

It has been ascertained that a laminated safety glass having such characteristic values has excellent resistance to shattering of glass and resistance to penetration of a colliding object in experiments conducted in accordance with a method for testing impact set forth in JIS R3205.

A glass laminate having an interlayer with a bond strength of less than 600 g/25 mm has inferior resistance to scattering of glass in the event of damage. A laminated glass article containing an interlayer having a holding power of less than 0.3 mm has poor resistance to penetration of a colliding object especially at a low temperature of less than −10° C. If the holding power exceeds 25 mm, the adhesive layer is too soft to obtain a sufficient bond strength, and tends to leak out from the edge portions of the laminated article.

A preferred laminated safety glass provided by the present invention is the one in which the sheet-like adhesive material forming the adhesive interlayer has a film substrate, especially a polyester film substrate, having a tensile strength of at least 100 kg/cm$^2$ and an elongation of at least 100%.

The following Examples illustrate the present invention in greater details. It should be understood that the invention is in no way limited by these Examples. All parts in these Examples are by weight.

The experiment in accordance with the method of testing impact set forth in JIS R3205, and the measurement of bond strength and holding power in accordance with the methods set forth in JIS Z1524 were performed as follows:

Impact test

A laminated safety glass was supported horizontal on a framework (inside size 285 mm×285 mm) of hard wood, and a steel ball having a weight of 225 g and a diameter of 38 in the stationary state was let fall onto the center of the glass from a height of 5 m without applying a force.

Method for measuring bond strength

A polyester film having thickness of 25 microns was applied to one surface of a test specimen (25 mm in width and 250 mm in length) of sheet-like adhesive material which developed its adhesiveness by an adhesiveness-imparting agent to an equivalent extent to the sheet-like adhesive material forming the interlayer of a laminated safety glass, and a 2 kg-roller was placed on the polyester film and reciprocated once at a speed of 5 mm/second thereby to bond the paper to the test specimen. After a lapse of at least 20 minutes, the test specimen was folded 180° and peeled off at a speed of 300 mm/min. The load required for peeling is defined as the bond strength.

Method for measuring holding power

The same test specimen as above was bonded to one end of a glass sheet by reciprocating a 2-kg roller over it at a speed of 5 mm/second so that an area of 25 mm×25 mm of the test piece contacted the glass plate. After a lapse of more than 20 minutes, the test specimen was suspended perpendicularly so that a load of 1 kg was exerted uniformly thereon. Fifteen minutes later, the length of deviation was measured.

The tack test method was performed in the following manner.

Tack test method (ball rolling by the J. Dow method)

A sheet of a given length was fixed to a slope having an angle of 30 degrees to a horizontal plane. A polyester or cellophane film was bonded to the sheet at an area ranging from its upper end to a point 10 cm below it to render this area non-tacky. Thirty two steel balls of different diameters (from 1/32 inch to 1 inch; increasing by 1/32 inch). The diameter of the largest ball which stopped on the sheet at a point within 10 cm from the top end of the adhesive area of the sheet was determined. For convenience, tack No. 1 was assigned to a 1/32 inch ball and No. 32 to a 1-inch ball, with the other balls having diameters between them given corresponding tack numbers. Commercially available both-surface pressure-sensitive adhesive tapes have a tack number of 12 to 23.

EXAMPLE 1

A mixture of 47 parts of methyl methacrylate, 36 parts of butyl acrylate, 8 parts of vinyl acetate, 9 parts of acrylic acid, 200 parts of ethyl acetate and 0.2 part of benzoyl peroxide was stirred in a stream of nitrogen at 80° C. to form a polymer solution. The resulting polymer solution was coated on both surfaces of a polyester film having a thickness of 75 microns so that the thickness of the coating on each surface after drying was 30 microns to obtain a sheet-like adhesive material. This sheet-like adhesive material had a tack number of not more than 3.

Dioctyl phthalate as an adhesiveness-imparting agent was coated on both surfaces of the sheet-like adhesive material, and a glass sheet having a thickness of 3 mm was laminated to both surfaces of the adhesive material. The assembly was pressed by nip rolls to sqeeze out the excess of the adhesiveness-imparting agent together with air bubbles therein. The amount of the adhesiveness-imparting agent remaining in the adhesive interlayer was 6 g/m$^2$ on each surface.

The resulting laminated safety glass was allowed to stand at room temperature for one week.

The laminated glass safety glass included an adhesive interlayer having a bond strength of 1200 g/25 mm, and a holding power of 8 mm.

The laminated safety glass was subjected to the impact test in accordance with the method of JIS R3205. The laminated glass was broken radially, but the steel ball did not penetrate through it and no scattering of the glass fragments was noted.

The glass neither showed abnormality in a boiling test whereby it was dipped in boiling water for 2 hours, or in a see-through test whereby an object was seen through the glass laminate to examine distortion of the image, etc.

EXAMPLE 2

A mixture consisting of 30 parts of methyl methacrylate 60 parts of butyl acrylate, 10 parts of acrylic acid, 200 parts of toluene and 0.2 part of benzoyl peroxide was stirred for 1 hour at 80° C. in an atmosphere of nitrogen to obtain a polymer solution. A sheet-like adhesive material having a thickness of 30 microns was produced by using the resulting polymer solution in the same way as in Example 1. The sheet-like adhesive material obtained had a tack number of not more than 3.

A mixture of 100 parts of dioctyl phthalate as an adhesiveness-imparting agent and 3 parts of an isocyanate as a curing agent was coated on both surfaces of the sheet-like adhesive material, and a laminated safety glass was produced in the same way as in Example 1 using the resulting sheet-like adhesive material.

This laminated safety glass included an adhesive interlayer having an adhesive bond strength of 1100 g/25 mm and a holding power of 1 mm, and showed good results in the impact test, boiling test and see-through test to the same extent as in Example 1.

EXAMPLE 3

A solution containing 100 parts of polyvinyl butyral, 5 parts of triethylene glycol di-2-ethyl butyrate and 400 parts of methyl ethyl ketone was coated on both surfaces of a polyester film having a thickness of 75 microns and dried so that the thickness of the resulting coating on each surface was 30 microns.

Triethylene glycol di-2-ethylbutyrate as an adhesiveness-imparting agent was coated on both surfaces of the sheet-like adhesive material, and a laminated safety glass was produced in the same way as in Example 1 using the sheet-like adhesive material.

The resulting laminated safety glass included an adhesive interlayer having a bond strength of 1460 g/25 mm and a holding power of 4 mm, and showed good results in the impact test, boiling test and see-through test to the same extent as in Example 1.

EXAMPLE 4

A methyl ethyl ketone solution of a polyester resin (derived from terephthalic acid/adipic acid/diethylene glycol/ethylene glycol in a mole ratio of 23/10/40/27) was coated on both surfaces of a polyester film having a thickness of 75 microns and dried so that the thickness of the coating on each surface was 30 microns. Dibutyl phthalate as an adhesiveness-imparting agent was coated on both surfaces of the resulting sheet-like adhesive material, and a safety laminate glass was produced in the same way as in Example 1 using the resulting sheet-like adhesive material. The amount of the adhesiveness-imparting agent remaining in the adhesive interlayer was 4 g/m$^2$.

The resulting laminated safety glass included an adhesive interlayer having a bond strength of 10.50 g/25 mm and a holding power of 3 mm and a tack number of not more than 3. It also showed good results in the same tests as conducted in Example 1.

EXAMPLE 5

A solution in a mixture of methyl ethyl ketone and toluene of a mixture of the same polyester resin as used in Example 4, a vinyl chloride/vinyl acetate/maleic anhydride resin (Geon ® 400x110A; a product of Nippon Zeon Co., Ltd.) and a petroleum resin (Petrosin ® #20; a product of Mitsui petrochemical Co., Ltd.) in a weight ratio of 5:3:20 was coated on a polyvinyl chloride film having a thickness of 75 microns. Otherwise, the same procedure as in Example 4 was repeated.

The resulting laminated safety glass included an adhesive interlayer having a bond strength of 920 g/25 mm, a holding power of 5 mm, and a tack number of not more than 3, and showed good results in the same tests as conducted in Example 1.

EXAMPLE 6

A toluene solution of 50 parts of an ethylene/vinyl acetate copolymer having a vinyl acetate unit content of 33% by weight, 45 parts of a petroleum resin (Petrosin ® #120) and 5 parts of hydroabietyl alcohol (ABITOL ®, Hercules, Inc.) was coated on an ethylene/vinyl acetate copolymer film having a thickness of 70 microns. Otherwise, the same procedure as in Example 5 was repeated. The resulting laminated safety glass included an adhesive interlayer having a bond strength of 1100 g/25 mm, a holding power of 7 mm and a tack number of not more than 3.

The laminated safety glass showed good results in the same tests as conducted in Example 1.

What we claim is:

1. A process for producing a safety laminate comprising at least two plates bonded to each other through an adhesive interlayer, which comprises
    applying an adhesiveness-imparting agent which is liquid at ambient temperature and is substantially non-adhesive to said plates to at least one of (a) the surface of each of said plates and (b) each surface to be bonded to said surface of said plates of a sheet-like adhesive material which is substantially non-adhesive, but which is latently adhesive, to said plates, said adhesiveness-imparting agent being a plasticizer capable of developing the latent adhesiveness of said sheet-like adhesive material to render it adhesive and wherein said sheet-like adhesive material is composed of a material selected from the group consisting of acrylic resins, polyvinylbutyral resins and polyester resins; and
    sandwiching said sheet-like adhesive material as an interlayer between two of said plates at ambient temperature to bond said plates through the interlayer of said sheet-like adhesive material when the adhesiveness is developed by the adhesiveness-imparting agent.

2. The process of claim 1 wherein said plates are glass sheets.

3. The process of claim 1 wherein at least one of said plates is a plate of an organic synthetic resin.

4. The process of claim 1 wherein said sheet-like adhesive material is composed of a material which is substantially non-adhesive and has a tack number of 3 or less determined by the tack testing method.

5. The process of claim 4 wherein said sheet-like adhesive material is composed of a material which is only latently adhesive and is non-tacky at ambient temperature.

6. The process of claim 1 wherein said sheet-like adhesive material consists of a film substrate having a tensile strength of at least 100 kg/cm$^2$ and an elongation of at least 100% and formed on both surfaces thereof, a layer of a material which is substantially non-adhesive, and only latently adhesive, to said plates.

7. The process of claim 1 wherein said adhesiveness-imparting agent has a viscosity of 1 to 500 centipoises at ambient temperature.

8. The process of claim 1 wherein said latently adhesive sheet-like adhesive material is made of an acrylic resin, and said adhesiveness-imparting agent is at least one member liquid at ambient temperature which is selected from the group consisting of phthalic esters, trimellitic esters, sebacic esters, glycerin esters, orthophosphoric esters, fumaric esters and maleic esters.

9. The process of claim 1 wherein said latently adhesive sheet-like adhesive material is made of a polyvinylbutyral resin, and said adhesiveness-imparting agent is at least one member liquid at ambient temperature which is selected from the group consisting of phthalic esters, ricinoleic esters, orthophthalic esters and glycol esters.

10. The process of claim 1 wherein said latently adhesive sheet-like adhesive material is made of a polyester resin, and said adhesiveness-imparting agent is at least one member liquid at ambient temperature which is selected from the group consisting of phthalic esters, orthophthalic esters, glycol esters, maleic esters and fumaric esters.

* * * * *